US012613459B2

(12) United States Patent
Takagi

(10) Patent No.: US 12,613,459 B2
(45) Date of Patent: Apr. 28, 2026

(54) WAVELENGTH CONVERSION APPARATUS, LIGHT SOURCE APPARATUS, AND PROJECTOR

(71) Applicant: SEIKO EPSON CORPORATION, Tokyo (JP)

(72) Inventor: Kunihiko Takagi, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 446 days.

(21) Appl. No.: 18/181,782

(22) Filed: Mar. 10, 2023

(65) Prior Publication Data

US 2023/0288792 A1    Sep. 14, 2023

(30) Foreign Application Priority Data

Mar. 10, 2022    (JP) ................................. 2022-036967

(51) Int. Cl.
*G03B 21/20*        (2006.01)
*G03B 21/14*        (2006.01)

(52) U.S. Cl.
CPC ......... *G03B 21/204* (2013.01); *G03B 21/145* (2013.01); *G03B 21/206* (2013.01); *G03B 21/2066* (2013.01); *G03B 21/2073* (2013.01)

(58) Field of Classification Search
CPC .. G03B 21/204; G03B 21/145; G03B 21/206; G03B 21/2066; G03B 21/2073; G03B 21/16
USPC ........................................................ 353/31
See application file for complete search history.

(56) References Cited

U.S. PATENT DOCUMENTS

| | | | |
|---|---|---|---|
| 2006/0157223 A1 | 7/2006 | Gelorme et al. | |
| 2007/0290310 A1 | 12/2007 | Hidetoshi et al. | |
| 2014/0176915 A1 | 6/2014 | Kyo | |
| 2016/0025307 A1 | 1/2016 | Adema et al. | |
| 2016/0026074 A1 | 1/2016 | Adema et al. | |
| 2019/0068936 A1 | 2/2019 | Kunihiko et al. | |
| 2020/0049323 A1* | 2/2020 | Arakawa | G02B 5/26 |
| 2020/0241405 A1 | 7/2020 | Nojima | |
| 2020/0241406 A1* | 7/2020 | Nojima | G03B 21/2066 |
| 2020/0409248 A1* | 12/2020 | Yasumatsu | G03B 21/2013 |
| 2022/0262759 A1 | 8/2022 | Shinya et al. | |
| 2023/0168569 A1* | 6/2023 | Tabayashi | H05K 7/20318 352/202 |

(Continued)

FOREIGN PATENT DOCUMENTS

| | | |
|---|---|---|
| CN | 101103658 A | 1/2008 |
| CN | 111487760 A | 8/2020 |

(Continued)

*Primary Examiner* — Magda Cruz

(74) *Attorney, Agent, or Firm* — Dority & Manning, P.A.

(57)        ABSTRACT

A wavelength conversion apparatus includes a base having a first surface, a wavelength converter disposed at a first surface side of the base and configured to convert first light having a first wavelength band into second light having a second wavelength band different from the first wavelength band, the wavelength converter including a light exiting surface which is provided at the side opposite from the base and via which the second light exits, a liquid metal disposed between the base and the wavelength converter, and a first restrictor holding the wavelength converter at the base and restricting a position of the wavelength converter in a first direction along a normal to the light exiting surface.

20 Claims, 10 Drawing Sheets

(56)  References Cited

U.S. PATENT DOCUMENTS

2023/0236487 A1 *  7/2023  Kadotani  ............  G03B 21/005
                                                       353/52
2024/0271775 A1      8/2024  Hikmet et al.

FOREIGN PATENT DOCUMENTS

| | | | |
|---|---|---|---|
| JP | H07-135279 | A | 5/1995 |
| JP | 2007335742 | A | 12/2007 |
| JP | 2008159850 | A * | 7/2008 ............ G03B 21/14 |
| JP | 2012-226986 | A | 11/2012 |
| JP | 2014123014 | A | 7/2014 |
| JP | 2016-031935 | A | 3/2016 |
| JP | 2017-045528 | A | 3/2017 |
| JP | 2017-207673 | A | 11/2017 |
| JP | 2019045620 | A | 3/2019 |
| JP | 2020-004497 | A | 1/2020 |
| JP | 2024-532680 | A | 9/2024 |
| KR | 20130075205 | A | 7/2013 |
| WO | WO2020162417 | A | 8/2020 |

* cited by examiner

WAVELENGTH CONVERSION APPARATUS, LIGHT SOURCE APPARATUS, AND PROJECTOR

The present application is based on, and claims priority from JP Application Serial Number 2022-036967, filed Mar. 10, 2022, the disclosure of which is hereby incorporated by reference herein in its entirety.

BACKGROUND

1. Technical Field

The present disclosure relates to a wavelength conversion apparatus, a light source apparatus, and a projector.

2. Related Art

In recent years, there is a light source apparatus that is a combination of a solid-state light source, such as a semiconductor laser, and a wavelength converter including a phosphor layer. In a light source apparatus of this type, an increase in the temperature of the phosphor layer undesirably lowers the fluorescence conversion efficiency. For example, in the light source apparatus disclosed in JP-A-2014-123014, the phosphor layer is bonded to a heat dissipating substrate via a metal bonding material to improve the phosphor cooling efficiency.

In the light source apparatus described above, however, since the phosphor layer and the heat dissipating substrate differ in the coefficient of expansion from each other, thermal stress induced when the phosphor layer heats up can cause damage to the phosphor layer or delamination of the phosphor layer off the substrate.

SUMMARY

To solve the problem described above, a wavelength conversion apparatus according to an aspect of the present disclosure includes a base having a first surface, a wavelength converter disposed at a first surface side of the base and configured to convet first light having a first wavelength band into second light having a second wavelength band different from the first wavelength band, the wavelength converter including a light exiting surface which is provided at a side opposite from the base and via which the second light exits, a liquid metal disposed between the base and the wavelength converter, and a first restrictor holding the wavelength converter at the base and restricting a position of the wavelength converter in a first direction along a normal to the light exiting surface.

A light source apparatus according to another aspect of the present disclosure includes a light source that emits the first light, and the wavelength conversion apparatus described above on which the first light emitted from the light source is incident.

A projector according to another aspect of the present disclosure includes the light source apparatus described above, a light modulator that modulates light emitted from the light source apparatus in accordance with image information, and a projection optical apparatus that projects the light modulated by the light modulator.

BRIEF DESCRIPTION OF THE DRAWINGS

FIG. 1 shows a schematic configuration of a projector according to a first embodiment.

FIG. 2 shows a schematic configuration of a light source apparatus.

FIG. 12 is a cross-sectional view showing the configuration of the wavelength conversion apparatus according to a fifth embodiment.

DESCRIPTION OF EXEMPLARY EMBODIMENTS

Figures 3, 4:
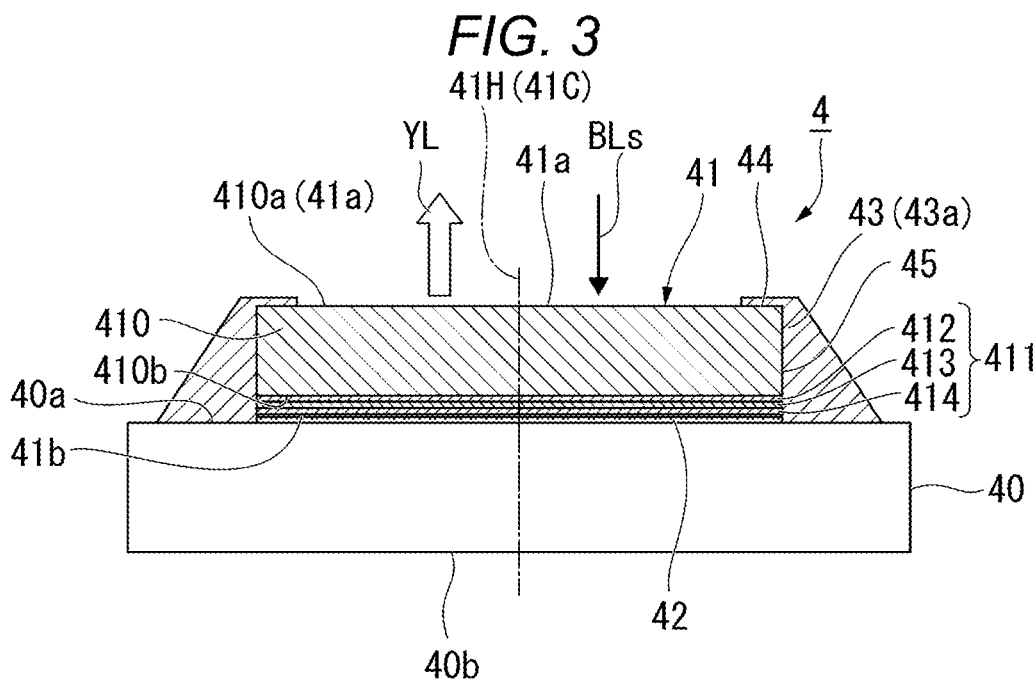
FIG. 3 is a cross-sectional view showing the configuration of a wavelength conversion apparatus.
FIG. 4 is a plan view showing the configuration of the wavelength conversion apparatus.

Embodiments of the present disclosure will be described below in detail with reference to the drawings.

In the drawings used in the description below, a characteristic portion is enlarged for convenience in some cases for clarity of the characteristic thereof, and the dimension ratio and other factors of each component are therefore not always equal to actual values.

First Embodiment

An example of a projector according to the present embodiment will first be described.

Figure 1:
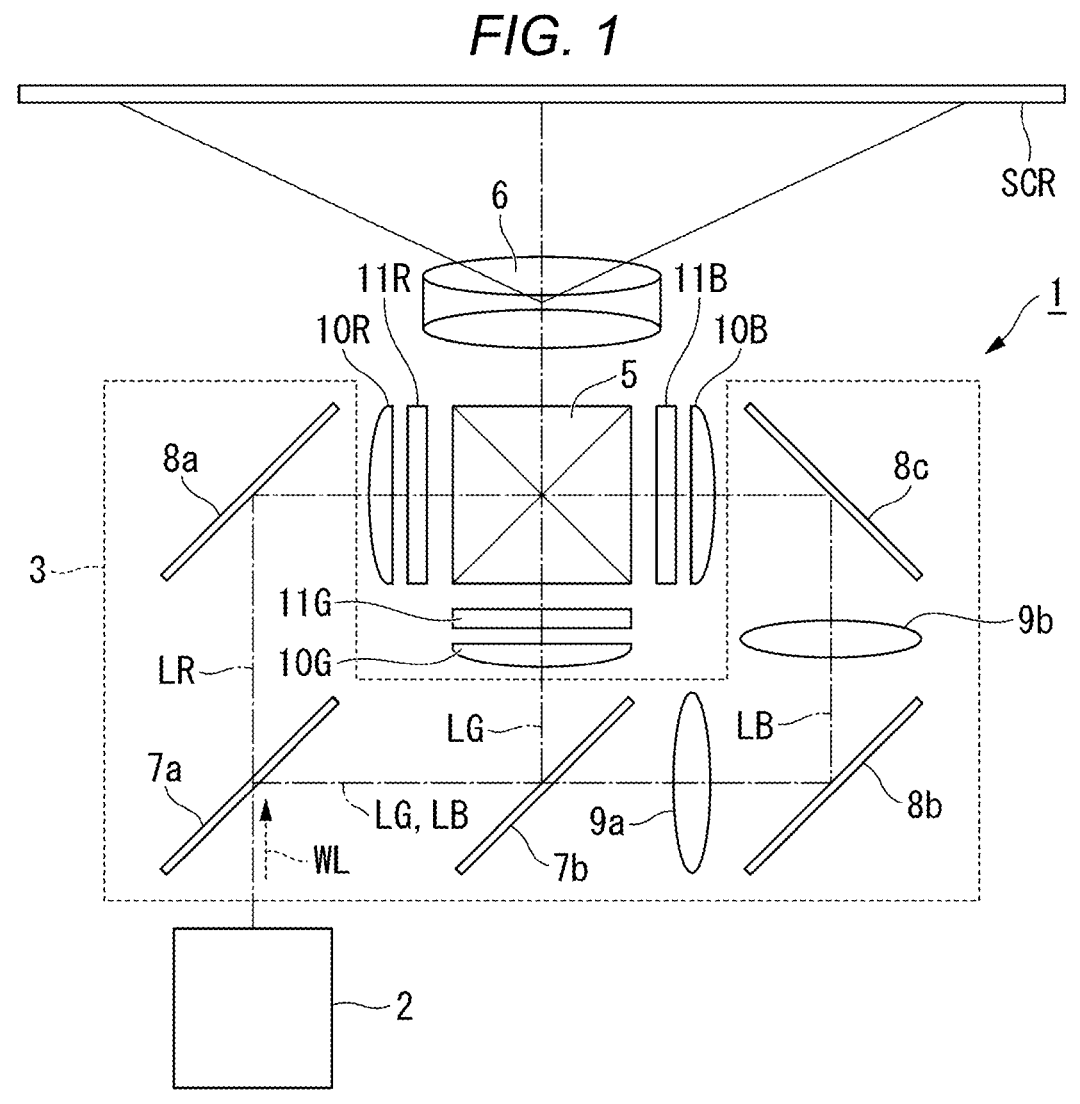

FIG. 1 shows a schematic configuration of the projector according to the present embodiment.

A projector 1 according to the present embodiment is a projection-type image display apparatus that displays color video images on a screen SCR, as shown in FIG. 1. The projector 1 includes a light source apparatus 2, a color separation system 3, light modulators 11R, 11G, and 11B, a light combining system 5, and a projection optical apparatus 6.

The color separation system 3 separates illumination light WL into red light LR, green light LG, and blue light LB. The color separation system 3 generally includes a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a separates the illumination light WL from the light source apparatus 2 into the red light LR and the other light (green light LG and blue light LB). The first dichroic mirror 7a transmits the separated red light LR and reflects the other light (green light LG and blue light LB). On the other hand, the second dichroic mirror 7b reflects the green light LG and transmits the blue light LB to separate the other light into the green light LG and the blue light LB.

The first total reflection mirror 8a is disposed in the optical path of the red light LR and reflects the red light LR having passed through the first dichroic mirror 7a toward the light modulator 11R. On the other hand, the second total reflection mirror 8b and the third total reflection mirror 8c are disposed in the optical path of the blue light LB and guide the blue light LB having passed through the second dichroic mirror 7b toward the light modulator 11B. The green light LG is reflected off the second dichroic mirror 7b toward the light modulator 11G.

The first relay lens 9a and the second relay lens 9b are disposed at the downstream of the second dichroic mirror 7b in the optical path of the blue light LB.

The light modulator 11R modulates the red light LR in accordance with image information to form image light corresponding to the red light LR. The light modulator 11G modulates the green light LG in accordance with image information to form image light corresponding to the green light LG. The light modulator 11B modulates the blue light LB in accordance with image information to form image light corresponding to the blue light LB.

The light modulators 11R, 11G, and 11B are each, for example, a transmissive liquid crystal panel. Polarizers (not shown) are disposed at the light incident and exiting sides of each of the liquid crystal panels.

Field lenses 10R, 10G, and 10B are disposed at the light incident side of the light modulators 11R, 11G, and 11B, respectively. The field lens 10R, 10G, and 10B parallelize the red light LR, the green light LG, and the blue light LB to be incident on the respective light modulators 11R, 11G, and 11B.

The light combining system 5 receives the image light from the optical modulator 11R, the image light from the optical modulator 11G, and the image light from the optical modulator 11B. The light combining system 5 combines the image light corresponding to the red light LR, the image light corresponding to the green light LG, and the image light corresponding to the blue light LB with one another and outputs the combined image light toward the projection optical apparatus 6. The light combining system 5 is formed, for example, of a cross dichroic prism.

The projection optical apparatus 6 is formed of a projection lens group and enlarges the combined image light from the light combining system 5 and projects the enlarged image light toward the screen SCR. Enlarged color video images are thus displayed on the screen SCR.

Light Source Apparatus

Figure 2:
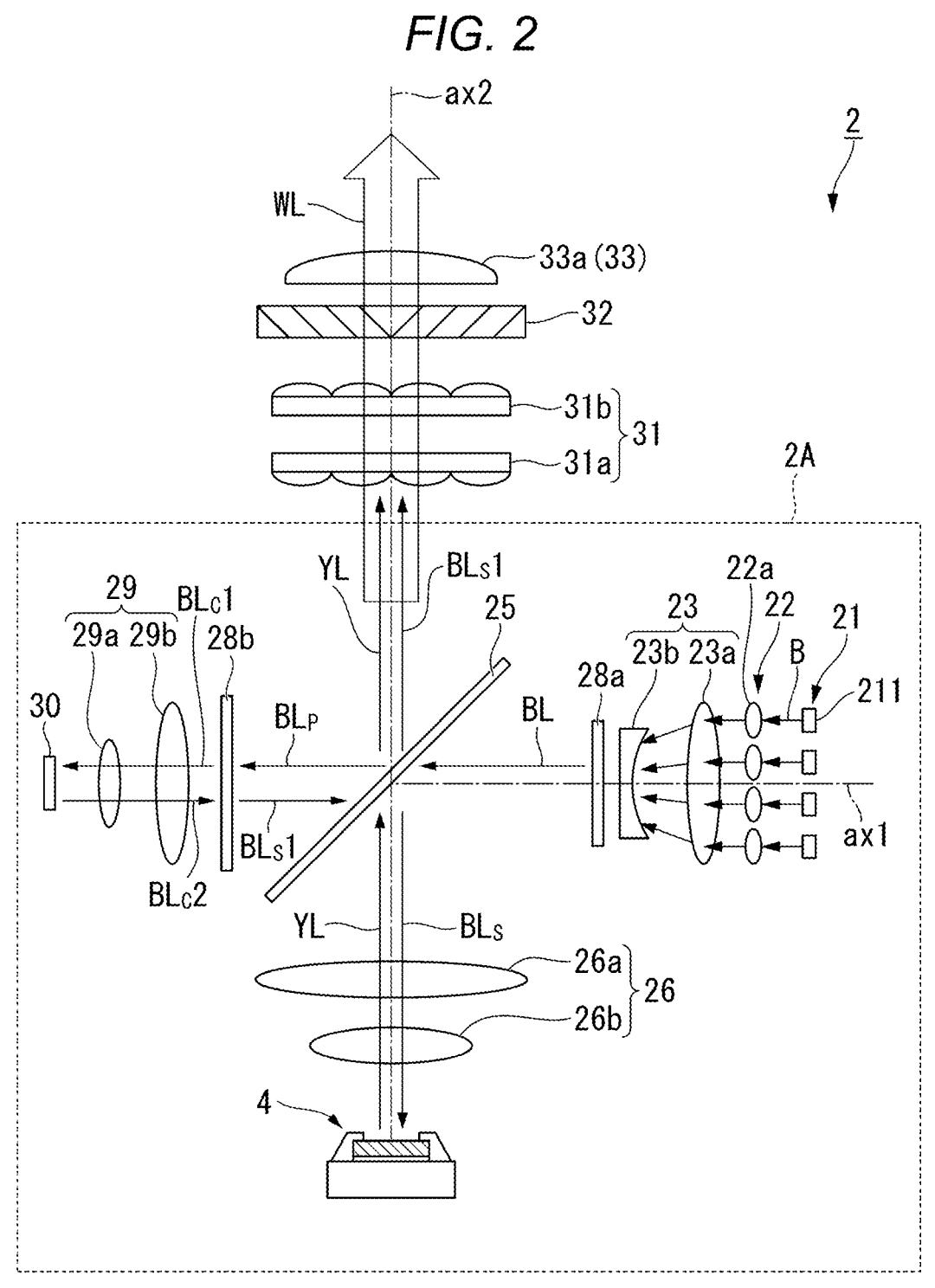

The light source apparatus 2 according to an embodiment of the present disclosure will be subsequently described. FIG. 2 shows a schematic configuration of the light source apparatus 2. The light source apparatus 2 includes a light source section 2A, an optical integration system 31, a polarization converter 32, and a superimposed lens 33a, as shown in FIG. 2. In the present embodiment, the optical integration system 31 and the superimposing lens 33a form a superimposing system 33.

The light source section 2A includes a light source 21, a collimator system 22, an afocal system 23, a first retardation film 28a, a polarization separator 25, a first light collection system 26, a wavelength conversion apparatus 4, a second retardation film 28b, a second light collection system 29, and a diffusive reflector 30.

The light source 21, the collimator system 22, the afocal system 23, the first retardation film 28a, the polarization separator 25, the second retardation film 28b, the second light collection system 29, and the diffusive reflector 30 are sequentially arranged on an optical axis ax1. On the other hand, the wavelength conversion apparatus 4, the first light collection system 26, the polarization separator 25, the optical integration system 31, the polarization converter 32, and the superimposing lens 33a are sequentially arranged on an illumination optical axis ax2. The optical axis ax1 and the illumination optical axis ax2 are present in the same plane and perpendicular to each other.

The light source 21 includes a plurality of semiconductor lasers 211 as the solid-state light source. The plurality of semiconductor lasers 211 are arranged in an array in a plane perpendicular to the optical axis ax1. The semiconductor lasers 211 each outputs, for example, a beam B having a blue wavelength band (first wavelength band) in which the light intensity peaks at a wavelength of 460 nm. Based on the configuration described above, the light source 21 in the present embodiment outputs a blue luminous flux (first light) BL formed of a plurality of beams B.

The blue luminous flux BL outputted from the light source 21 enters the collimator system 22. The collimator system 22 converts the blue luminous flux BL outputted from the light source 21 into parallelized light. The collimator system 22 is formed, for example, of a plurality of collimator lenses 22a arranged in an array. The plurality of collimator lenses 22a are arranged in correspondence with the plurality of semiconductor lasers 211.

The blue luminous flux BL having passed through the collimator system 22 enters the afocal system 23. The afocal system 23 adjusts the luminous flux diameter of the blue luminous flux BL. The afocal system 23 is formed, for example, of a convex lens 23a and a concave lens 23b.

The blue luminous flux BL having passed through the afocal system 23 enters the first retardation film 28a. The first retardation film 28a is, for example, a half wave plate configured to be rotatable. The blue luminous flux BL outputted from the semiconductor lasers 211 is linearly polarized light. Appropriately setting the angle of rotation of the first retardation film 28a allows the blue luminous flux BL passing through the first retardation film 28a to be converted into a beam containing an S-polarized component and a P-polarized component with respect to the polarization separator 25 mixed with each other at a predetermined ratio. The ratio between the S-polarization component and the P-polarization component can be changed by rotating the first retardation film 28a.

The blue luminous flux BL containing the S-polarized and P-polarized components and generated when passing through the first retardation film 28a enters the polarization separator 25. The polarization separator 25 is formed, for example, of a polarization beam splitter having wavelength selectivity. The polarization separator 25 inclines by 45° with respect to the optical axis ax1 and the illumination optical axis ax2.

The polarization separator 25 has a polarization separation function of separating the blue luminous flux BL into beams BLs, which are formed of the S-polarized component with respect to the polarization separator 25, and beams BLp, which are formed of the P-polarized component with respect to the polarization separator 25. Specifically, the polarization separator 25 reflects the beams BLs, which are formed of the S-polarized component, and transmits the beams BLp, which are formed of the P-polarized component.

The polarization separator 25 further has a color separation function of transmitting the fluorescence YL, which has a wavelength band different from that of the blue luminous flux BL, irrespective of the polarization state of the fluorescence YL.

The S-polarized beams BLs having exited out of the polarization separator 25 enter the first light collection system 26. The first light collection system 26 collects the beams BLs and directs the collected beams BLs toward the wavelength conversion apparatus 4.

In the present embodiment, the first light collection system 26 is formed, for example, of a first lens 26a and a second lens 26b. The beams BLs having exited out of the first light collection system 26 are incident in the form of a collected spot on the wavelength conversion apparatus 4.

The fluorescence YL generated by the wavelength conversion apparatus 4 is parallelized by the first light collection system 26 and then enters the polarization separator 25. The fluorescence YL passes through the polarization separator 25.

On the other hand, the P-polarized beams BLp having exited out of the polarization separator 25 enter the second retardation film 28b. The second retardation film 28b is formed of a quarter wave plate disposed in the optical path between the polarization separator 25 and the diffusive reflector 30. The P-polarization beams BLp having exited out of the polarization separator 25 are therefore converted by the second retardation film 28b, for example, into right-handed circularly polarized blue light BLc1, which then enters the second light collection system 29.

The second light collection system 29 is formed, for example, of convex lenses 29a and 29b and causes the blue light BLc1 to be incident in the form of a collected spot on the diffusive reflector 30.

The diffusive reflector 30 is disposed on the side across the polarization separator 25 from the wavelength conversion apparatus 4 and diffusively reflects the blue light BLc1 having exited out of the second light collection system 29 toward the polarization separator 25. The diffusive reflector 30 preferably reflects the blue light BLc1 in the Lambertian reflection scheme but does not disturb the polarization state thereof.

The light diffusively reflected off the diffusive reflector 30 is hereinafter referred to as blue light BLc2. According embodiment, the diffusively reflected blue light BLc1 forms the blue light BLc2 having a substantially uniform illuminance distribution. For example, the right-handed circularly polarized blue light BLc1 is reflected in the form of left-handed circularly polarized blue light BLc2.

The blue light BLc2 is converted by the second light collection system 29 into parallelized light, which then enters the second retardation film 28b again.

The left-handed circularly polarized blue light BLc2 is converted by the second retardation film 28b into S-polarized blue light BLs1. The S-polarized blue light BLs1 is reflected off the polarization separator 25 toward the optical integration system 31.

The blue light BLs1 is thus used along with the fluorescence YL having passed through the polarization separator 25, as the illumination light WL. That is, the blue light BLs1 and the fluorescence YL both exit out of the polarization separator 25 in the same direction to form the illumination light WL, which is white light and the combination of the blue light BLs1 and the fluorescence YL (yellow light).

The illumination light WL exits toward the optical integration system 31. The optical integration system 31 is formed, for example, of lens arrays 31a and 31b. The lens arrays 31a and 31b are each formed of a plurality of lenslets arranged in an array.

The illumination light WL having passed through the optical integration system 31 enters the polarization converter 32.

The polarization converter 32 is formed of polarization separation films and retardation films. The polarization converter 32 converts the illumination light WL containing the unpolarized fluorescence YL into linearly polarized light.

The illumination light WL having passed through the polarization converter 32 enters the superimposing lens 33a. The superimposing lens 33a cooperates with the optical integration system 31 to homogenize the illuminance distribution of the illumination light WL in an illumination receiving region. The light source apparatus 2 thus produces the illumination light WL.

Wavelength Conversion Apparatus

The configuration of the wavelength conversion apparatus 4 will subsequently be described. FIG. 3 is a cross-sectional view showing the configuration of the wavelength conversion apparatus. FIG. 4 is a plan view showing the configuration of the wavelength conversion apparatus. FIG. 3 corresponds to the cross section taken along the line III-III in FIG. 4. FIG. 3 shows the beams BLS incident as excitation light on the wavelength conversion apparatus 4, and the fluorescence YL emitted from the wavelength conversion apparatus 4.

The wavelength conversion apparatus 4 includes a base 40, a wavelength converter 41, a liquid metal 42, and a first restrictor 43, as shown in FIGS. 3 and 4. The wavelength conversion apparatus 4 according to the present embodiment employs a fixed configuration in which the base 40 does not rotate, but may instead employ a rotary configuration in which the base 40 rotates.

The beams BLs having exited out of the first light collection system 26 enter the wavelength conversion apparatus 4. The wavelength conversion apparatus 4 converts the incident beams BLs in terms of wavelength to generate the fluorescence YL and outputs the generated fluorescence YL toward the first light collection system 26. In the present embodiment, the fluorescence (second light) YL is, for example, yellow light having wavelengths ranging from 500 to 700 nm (second wavelength band different from first wavelength band).

The base 40 has a first surface 40a, which faces the first light collection system 26, and a second surface 40b, which faces the side opposite from the first surface 40a. The wavelength conversion apparatus 4 may include a heat dissipating member as required at the second surface 40b of the base 40.

The base 40 is preferably made of a material that has high thermal conductivity and excels in heat dissipation capability, and examples of the material of the base 40 may include inorganic oxides such as alumina, sapphire, aluminum nitride, and diamond, metals such as aluminum and copper, and carbon graphite. When the cost and thermal conductivity are important, the base 40 is preferably made of copper.

In the present embodiment, the base 40 is configured in the form of a vapor chamber. A vapor chamber has a sealed structure in which a hollow portion containing a small amount of refrigerant (water) is wrapped with a thin copper sheet. When heat is applied to the base 40 configured in the form of a vapor chamber, the water in the hollow portion changes in terms of phase into vapor and spreads in the hollow portion, so that the heat diffuses and dissipates. The vapor in the hollow portion releases the heat and returns back to water.

When the vapor chamber is overheated, the pressure of the vapor increases, and the thin copper sheet may be deformed. When the phosphor layer is bonded to the heat dissipating substrate via sintered Ag nanoparticles in the related art, the vapor chamber may be deformed because heat of about 250° C. is applied thereto. In contrast, in the wavelength conversion apparatus 4 according to the present embodiment, the liquid metal 42 is used to eliminate the need to bond a phosphor layer 410 to the base 40 through sintering, so that a vapor chamber can be used as the base 40.

The wavelength converter 41 is disposed at the side facing the first surface 40a of the base 40 and includes the phosphor layer (wavelength conversion layer) 410 and a reflection member 411.

In the present embodiment, the phosphor layer 410 is made, for example, of a ceramic material, YAG phosphor particles mixed and integrated with a ceramic binder, or YAG phosphor particles mixed and integrated with a glass binder.

The reflection member 411 is provided at a rear surface 410b, which is the surface, of the fluorescence layer 410, that faces the base 40. The reflection member 411 in the present embodiment has a multilayer structure including at least an enhanced reflection layer 412, a reflection layer 413, and a protective layer 414, which are sequentially stacked from the side facing the rear surface 410b of the phosphor layer 410 toward the first surface 40a of the base 40.

The enhanced reflection layer 412, which is formed of multiple layers that provide an enhanced reflection effect, provides an effect of improving the efficiency at which the fluorescence YL is extracted. In the present embodiment, the enhanced reflection layer 412 is made, for example, of $Nb_2O_5$, $SiO_2$, or $Al_2O_3$.

The reflection layer 413 is a layer that reflects the beams BLs or the fluorescence YL having entered the reflection member 411. The reflection layer 413 is made, for example, of Ag or Al. In the present embodiment, the reflection layer 413 is formed of an Ag layer that provides higher reflectance.

The protective layer 414 is formed of an inorganic oxide film or an amorphous film. The protective layer 414 protects the reflection layer 413 from erosion caused by the liquid metal 42. In particular, an amorphous film has no crystal grain boundaries and therefore provides good protection against erosion caused by the liquid metal 42. The reflection member 411 can thus maintain its reflective characteristics in a stable manner over a long period of time by protecting the reflection layer 413.

In the present embodiment, the wavelength converter 41 is configured to output the fluorescence YL, which is the result of the wavelength conversion of the beams BLs incident via an upper surface 410a of the phosphor layer 410, via the upper surface 410a of the phosphor layer 410. That is, the upper surface 410a of the phosphor layer 410 corresponds to a light exiting surface 41a of the wavelength converter 41. The light exiting surface 41a of the wavelength converter 41 is also the light incident surface on which the beams BLs having exited out of the first light collection system 26 are incident.

The liquid metal 42 is disposed in the gap between the base 40 and a rear surface 41b of the wavelength converter

41 (surface of reflection member 411). In the present embodiment, the volume of the liquid metal 42 is set so as to be smaller than (from 60% to 99%, for example) the volume of the gap between the base 40 and the wavelength converter 41. When the volume of the liquid metal 42 is smaller than the volume of the gap, thermal deformation of the vapor chamber or expansion of the liquid metal 42 does not increase the pressure of the liquid metal 42 in the gap, so that leakage of the liquid metal 42 can be prevented.

The liquid metal 42 cools the phosphor layer 410 by transferring the heat generated therein to the base 40.

The liquid metal 42 can, for example, be one or more low-melting-point metals selected from the group consisting of Ga (melting point: 29.8° C., thermal conductivity: 40.6 W/mK), In (melting point: 156.4° C., thermal conductivity: 81.6 W/mK), and Sn (melting point: 231.97° C., thermal conductivity: 66.6 W/mK) or an alloy containing the one or more low-melting-point metals.

Specific examples of the alloy may include In—Ag, Sn—Ag—Cu, In—Sn—Bi, Ga—In—Sn—Zn, Ga—In—Sn, and Ga—In.

In the present specification, the liquid metal 42 only needs to be a metal that at least transforms into liquid having fluidity when the phosphor layer 410 of the wavelength converter 41 heats up and may not have fluidity at room temperature.

The first restrictor 43 holds the wavelength converter 41 at the base 40, and restricts the position of the wavelength converter 41 in an optical axis direction (first direction) 41C along a normal 41H to the light exiting surface 41a. The optical axis direction 41C is a direction along the chief of the fluorescence YL that exits via the light exiting surface 41a, and is also a direction along the optical axis ax2 of the light source apparatus 2.

The situation in which the position of the wavelength converter 41 is restricted in the optical axis direction 41C means that the distance in the optical axis direction 41C between the upper surface 410a of the phosphor layer 410 and the first light collection system 26 does not change.

In the present embodiment, the first restrictor 43 includes a sealing member 43a, which seals the liquid metal 42 between the base 40 and the wavelength converter 41. The first restrictor 43 in the present embodiment is disposed so as to function as a frame that surrounds the wavelength converter 41. The first restrictor 43 is formed, for example, by applying and curing a silicone-based adhesive having high heat resistance. In the present embodiment, the first restrictor 43 is disposed so as to extend to an outer edge 44 of the light exiting surface 41a of the wavelength converter 41, a side surface 45, of the wavelength converter 41 (phosphor layer 410), which intersects with the light exiting surface 41a, and a portion of the first surface 40a of the base 40. The wavelength converter 41 is thus held at the first surface 40a of the base 40.

The wavelength conversion apparatus 4 according to the present embodiment described above provides the following effects.

The wavelength conversion apparatus 4 according to the present embodiment includes the base 40, the wavelength converter 41 including the phosphor layer 410 and the reflection member 411, the liquid metal 42 disposed between the base 40 and the phosphor layer 410, and the first restrictor 43, which restricts the position of the wavelength converter 41 in the optical axis direction 41C along the normal 41H to the light exiting surface 41a.

The wavelength conversion apparatus 4 according to the present embodiment, in which no stress is induced in the liquid metal 42 in the event of an increase in the temperature of the phosphor layer 410 even when the phosphor layer 410 and the base 40 differ in the coefficient of expansion from each other, can suppress damage to the phosphor layer 410, delamination thereof, or other problems due to thermal stress induced in the phosphor layer 410.

In addition, the first restrictor 43 maintains the liquid metal 42 being in contact with both the wavelength converter 41 and the base 40, whereby the heat generated in the phosphor layer 410 of the wavelength converter 41 is efficiently dissipated through transmission to the base 40 via the liquid metal 42. The efficiency at which the phosphor layer 410 is cooled is thus increased, whereby bright fluorescence YL can be generated.

Even when the temperature of the wavelength converter 41 rises, the first restrictor 43 maintains the distance between the light exiting surface 41*a* of the wavelength converter 41 and the first light collection system 26 substantially fixed, so that the spot size of the excitation light (beams BLs) formed on the phosphor layer 410 does not change, whereby the light density in the phosphor layer 410 can be kept constant. In addition, the amount of fluorescence YL emitted from the phosphor layer 410 and captured by the first light collection system 26 can be kept constant. That is, the thus provided first restrictor 43 allows the fluorescence YL to be generated in a stable manner in the phosphor layer 410 and the generated fluorescence YL to be efficiently captured and utilized.

In the present embodiment, the first restrictor 43 includes the sealing member 43*a*, which seals the liquid metal 42 between the base 40 and the wavelength converter 41.

The configuration described above can suppress leakage of the liquid metal 42 via the gap between the wavelength converter 41 and the base 40. In addition, even where the phosphor layer 410 and the base 40 differ in the coefficient of expansion from each other, the sealing member 43*a* is slightly deformed, so that stress is not induced in the phosphor layer 410. Damage to the phosphor layer 410, delamination thereof, or other problems due to thermal stress induced in the phosphor layer 410 can be thus suppressed.

In the present embodiment, the first restrictor 43 is disposed so as to cover the outer edge 44 of the light exiting surface 41*a* of the wavelength converter 41 and the side surface 45 of the wavelength converter 41.

According to the configuration described above, the area sealed by the first restrictor 43 is expanded, whereby leakage of the liquid metal 42 via the gap between the wavelength converter 41 and the base 40 can be further suppressed. The wavelength converter 41 can also be bonded to the base 40 with increased bonding strength.

In the present embodiment, the wavelength converter 41 includes the phosphor layer 410 and the reflection member 411, and the reflection member 411 has the multilayer structure including the reflection layer 413 and the protective layer 414, which protects the reflection layer 413.

If the liquid metal 42 comes into contact with the reflection layer 413 made of Ag or Al, the liquid metal 42 may erode the reflection layer 413 via the grain boundaries and cause a decrease in reflectance. In contrast, the present embodiment, in which the protective layer 414 protects the reflection layer 413, allows protection of the reflection layer 413 against erosion caused by the liquid metal 42.

In the present embodiment, the base 40 is formed of a vapor chamber.

The base 40 formed of a vapor chamber has high thermal conductivity and excels in heat dissipation, allowing efficient cooling of the wavelength converter 41. The intensity of the beams BLs as the excitation light with which the wavelength converter 41 is irradiated can therefore be increased, whereby the brightness of the generated illumination light WL can be increased.

The light source apparatus 2 according to the present embodiment includes the wavelength conversion apparatus 4 and the light source 21, which outputs the beams BLs toward the wavelength conversion apparatus 4.

The light source apparatus 2 according to the present embodiment excels in reliability and can generate bright illumination light WL because the light source apparatus 2 includes the wavelength conversion apparatus 4, which allows suppression of damage and delamination of the wavelength converter 41, an increase in the light utilization efficiency, and efficient cooling of the wavelength converter 41.

The projector 1 according to the present embodiment includes the light source apparatus 2, the light modulators 11R, 11G, and 11B, which modulate the light outputted from the light source apparatus 2 in accordance with image information, and the projection optical apparatus 6, which projects the light modulated by the light modulators 11R, 11G, and 11B.

The projector 1 according to the present embodiment, which includes the light source apparatus 2, which excels in reliability and generates the bright illumination light WL, can project a bright image for a long period of time.

First Variation

The wavelength conversion apparatus according to a first variation will be subsequently described. The present variation and the first embodiment differ from each other in that the base is provided with a recess, and are the same in terms of the other configurations. The configurations common to those in the first embodiment therefore have the same reference characters and will not be described in detail.

Figures 5, 6A:
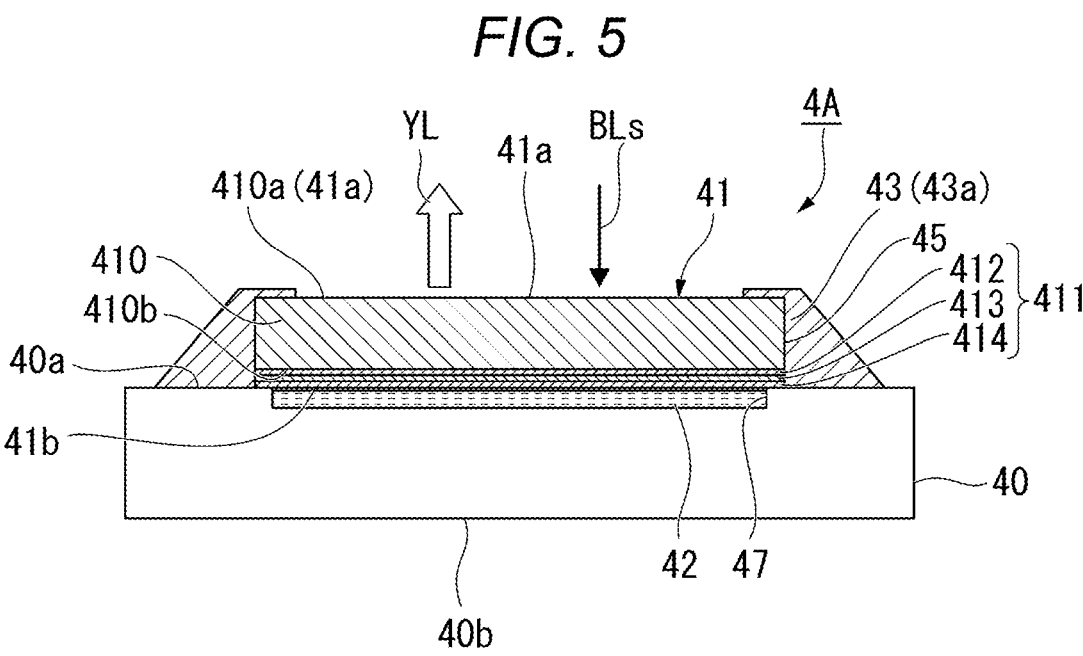
FIG. 5 is a cross-sectional view showing the configuration of the wavelength conversion apparatus according to a first variation.
FIG. 6A is a cross-sectional view showing the configuration of the wavelength conversion apparatus according to a second embodiment.

FIG. 5 is a cross-sectional view showing the configuration of the wavelength conversion apparatus according to the present variation.

In a wavelength conversion apparatus 4A according to the present variation, a recess (first recess) 47 is formed at the first surface 40*a* of the base 40, as shown in FIG. 5. The depth of the recess 47 is set at a value ranging, for example, from 5 μm to 100 μm. The planar area of the recess 47 is smaller than the planar area of the wavelength converter 41 (phosphor layer 410). Therefore, the rear surface 410*a* of the phosphor layer 410 is separate from the base 40 in the portion where the rear surface 410*b* faces the recess 47 but is in contact with the base 40 in the portion where the rear surface 410*a* does not face the recess 47.

The liquid metal 42 is disposed in the recess 47. The volume of the liquid metal 42 is set so as to be smaller than (60% to 99%, for example) the volume of the recess 47. When the volume of the liquid metal 42 is smaller than the volume of the recess 47, thermal deformation of the vapor chamber or expansion of the liquid metal 42 does not increase the pressure of the liquid metal 42 in the recess 47, so that leakage of the liquid metal 42 can be prevented.

In the present variation, the entire liquid metal 42 is disposed in the recess 47. Instead, a portion of the liquid metal 42 may be disposed in the recess 47, and the remaining portion of the liquid metal 42 may be disposed between the first surface 40*a* of the base 40 and the rear surface 41*b* of the wavelength converter 41 (surface of reflection member 411). In the present variation, the recess 47 is formed at the first surface 40a of the base 40. Instead, the recess 47 may be formed at the rear surface 41b of the wavelength converter 41. Still instead, the recess 47 may be formed both at the first surface 40a of the base 40 and the rear surface 41b of the wavelength converter 41. In other words, the recess 47 is formed in at least one of the base 40 and the wavelength converter 41.

The wavelength conversion apparatus 4A according to the present variation, in which the liquid metal 42 is disposed in the recess 47 formed at the first surface 40a of the base 40, and no gap is created in the region that surrounds the outer circumference of the recess 47 because the first surface 40a of the base 40 and the rear surface 41b of the wavelength converter 41 are in contact with each other, allows suppression of leakage of the liquid metal 42 out of the wavelength conversion apparatus 4A.

Second Embodiment

The wavelength conversion apparatus according to a second embodiment will be subsequently described. The present embodiment and the first embodiment differ from each other in terms of the configurations of the first restrictor and the base, and are the same in terms of the other configurations. Therefore, in the following description, the configurations of the first restrictor and therearound will be primarily described, and the configurations and members common to those in the first embodiment have the same reference characters and will not be described in detail or will be described in a simplified manner.

Figure 6B:
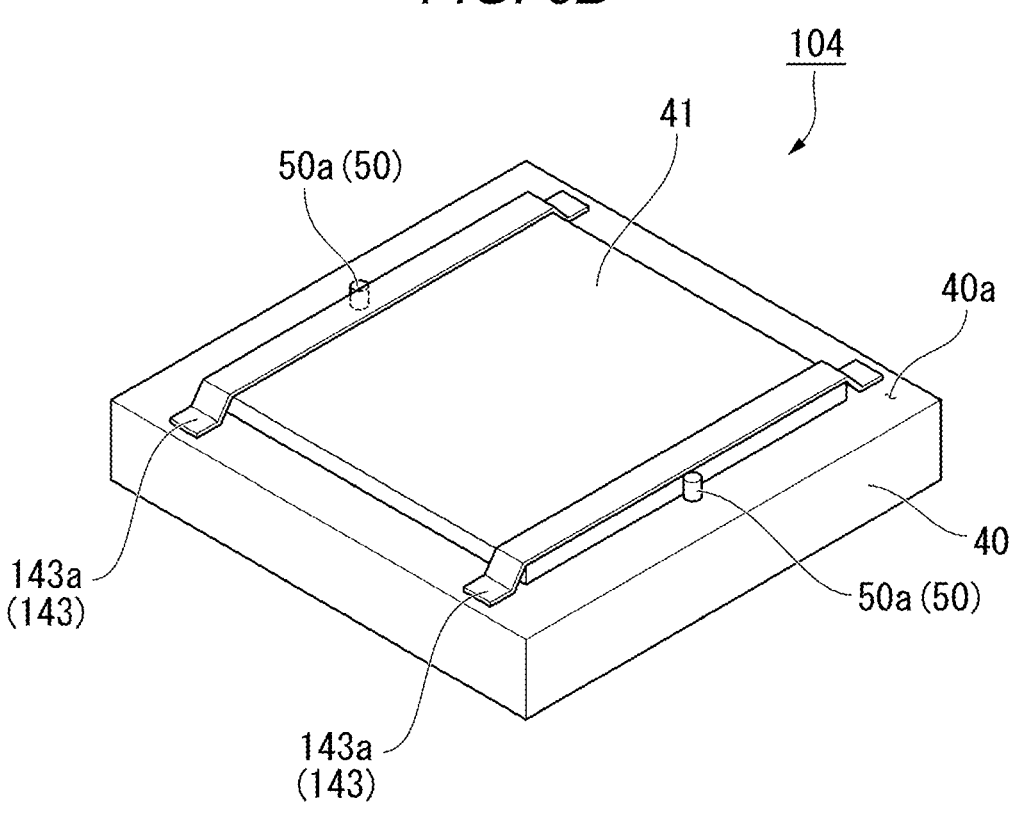
FIG. 6B is a perspective view showing the configuration of the wavelength conversion apparatus according to the second embodiment.

FIG. 6A is a cross-sectional view showing the configuration of the wavelength conversion apparatus according to the present embodiment, and FIG. 6B is a perspective view showing the configuration of the wavelength conversion apparatus according to the present embodiment.

A wavelength conversion apparatus 104 according to the present embodiment includes the base 40, the wavelength converter 41, the liquid metal 42, a first restrictor 143, and a second restrictor 50, as shown in FIGS. 6A and 6B.

In the present embodiment, the recess 47 is formed at the first surface 40a of the base 40, and the liquid metal 42 is disposed in the recess 47, as shown in FIG. 6A, as in the first variation described above.

The first restrictor 143 in the present embodiment includes a pair of plate springs (elastic member) 143a, which press the wavelength converter 41 toward the base 40. The pair of plate springs 143a press portions, of the upper surface 410a of the phosphor layer 410, that do not fall within the range of the recess 47 when viewed in the plan view. According to the configuration described above, the elastic force of the plate springs 143a can suppress cracking due to deformation of the phosphor layer 410.

The second restrictor 50 includes a pair of pins 50a provided at the first surface 40a of the base 40. The pair of pins 50a are disposed so as to be separate from each other. The distance between the pair of pins 50a corresponds to one of the width dimensions of the wavelength converter 41. The pair of pins 50a, which sandwich the wavelength converter 41, therefore restrict the position of the wavelength converter 41 in a width direction (second direction) 41D perpendicular to the optical axis direction 41C.

In the present embodiment, the pair of pins 50a restrict the position of the wavelength converter 41 in the width direction 41D, in which the pair of plate springs 143a do not provide sufficient position restriction. The wavelength converter 41 is thus satisfactorily held on the base 40 with the position of the wavelength converter 41 restricted by the first restrictor 143 and the second restrictor 50.

In the wavelength conversion apparatus 104 according to the present embodiment, even when the phosphor layer 410 and the base 40 differ in the coefficient of expansion from each other, the first restrictor 143 including the plate springs 143a is elastically deformed to prevent stress from being induced in the phosphor layer 410. Damage to the phosphor layer 410 and delamination thereof due to stress induced in the phosphor layer 410 can thus be suppressed.

Second Variation

The wavelength conversion apparatus according to a second variation will be subsequently described. The present variation relates to the configuration of combination of the configuration in the first variation described above and the plate springs in the second embodiment.

Figure 7:
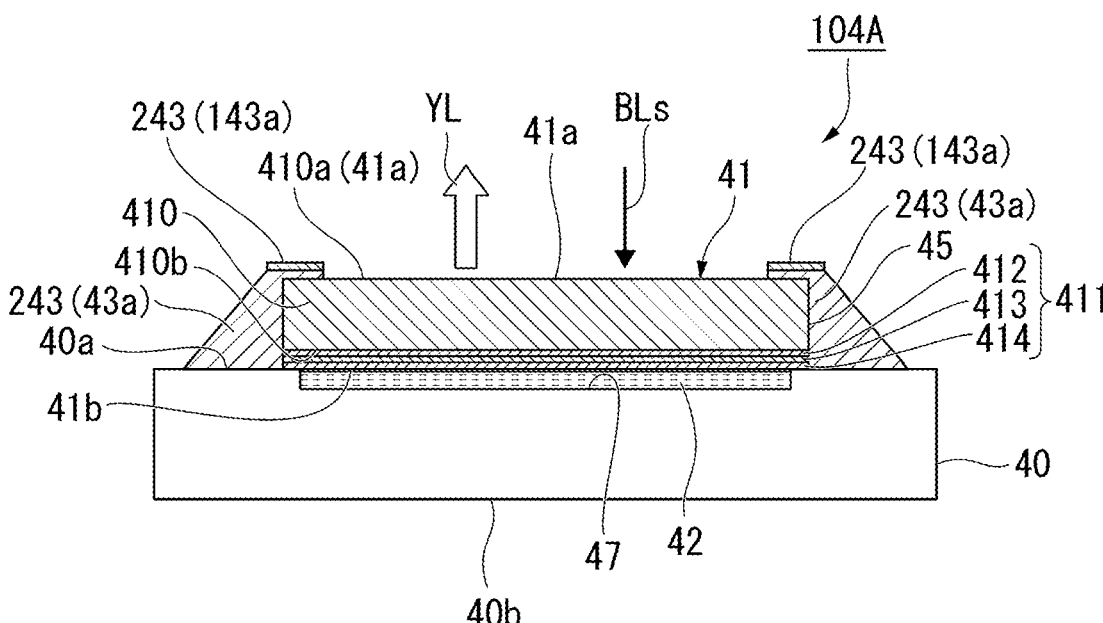
FIG. 7 is a cross-sectional view showing the configuration of the wavelength conversion apparatus according to a second variation.

FIG. 7 is a cross-sectional view showing the configuration of the wavelength conversion apparatus according to the present variation.

A wavelength conversion apparatus 104A according to the present variation includes the base 40, the wavelength converter 41, the liquid metal 42, and a first restrictor 243, as shown in FIG. 7.

The first restrictor 243 in the present variation includes the sealing member 43a and the pair of plate springs 143a.

In the wavelength conversion apparatus 104A according to the present variation, in which the first restrictor 243 includes both the sealing member 43a and the pair of plate springs 143a, the elastic force of the plate springs 143a can hold the phosphor layer 410 at the base 40 in a stabler manner with leakage of the liquid metal 42 prevented. A decrease in the light utilization efficiency due to a change in the distance between the upper surface 410a of the phosphor layer 410 and the first light collection system 26 can therefore be prevented.

Third Embodiment

The wavelength conversion apparatus according to a third embodiment will be subsequently described. The wavelength conversion apparatus according to the present embodiment differs from the wavelength conversion apparatus 4 according to the first embodiment in that a frame is disposed between the base 40 and the wavelength converter 41, and are the same in terms of the other configurations. In the following description, the configurations and members common to those in the first embodiment have the same reference characters, and will not be described in detail or will be described in a simplified manner.

Figure 8A:
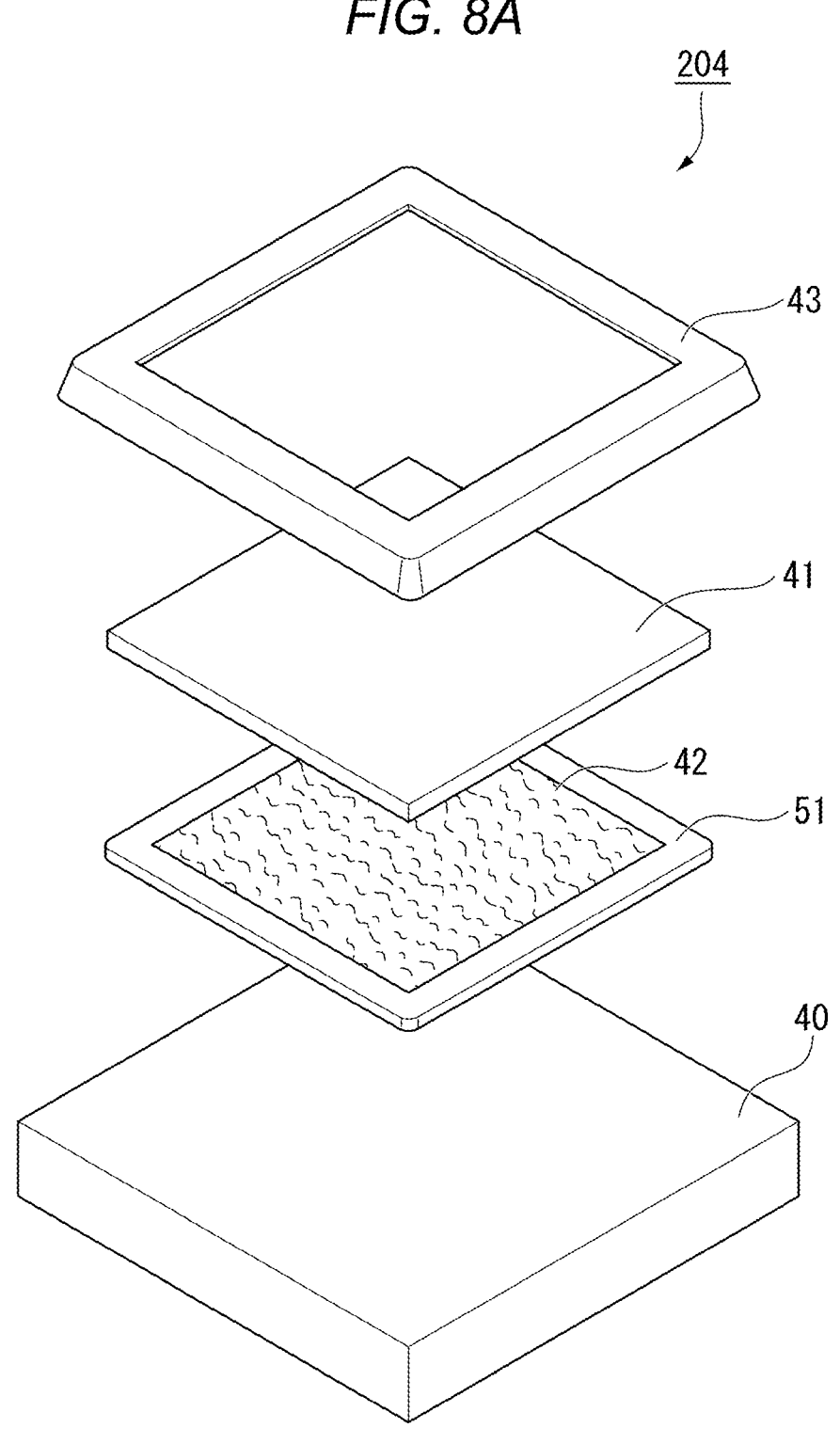
FIG. 8A is an exploded perspective view showing the configuration of the wavelength conversion apparatus according to a third embodiment.
Figure 8B:
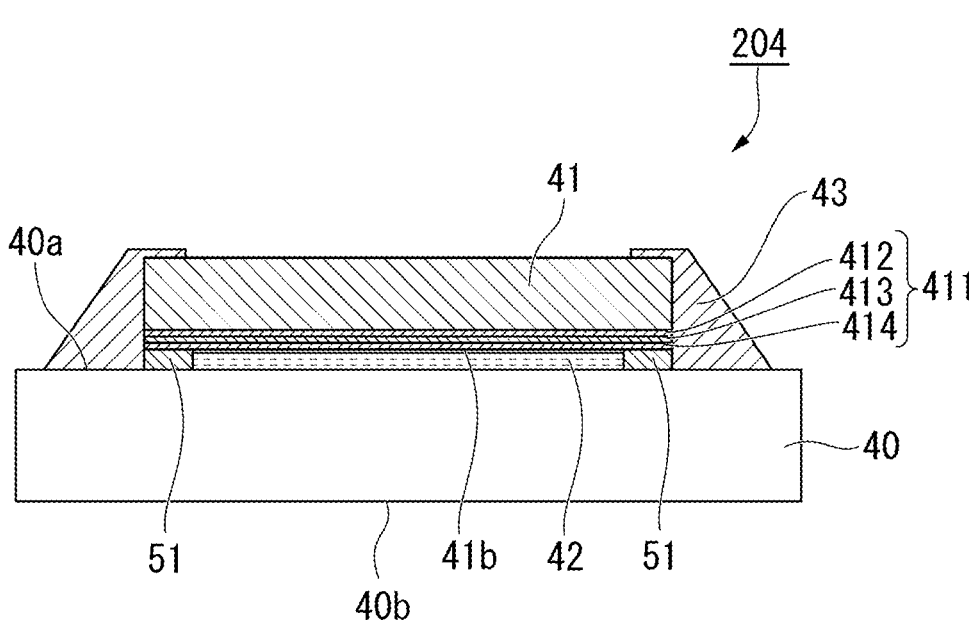
FIG. 8B is a cross-sectional view showing the configuration of the wavelength conversion apparatus according to the third embodiment.

FIG. 8A is an exploded perspective view showing the configuration of the wavelength conversion apparatus according to the present embodiment, and FIG. 8B is a cross-sectional view showing the configuration of the wavelength conversion apparatus according to the present embodiment.

A wavelength conversion apparatus 204 according to the present embodiment includes the base 40, the wavelength converter 41, the liquid metal 42, the first restrictor 43, and a frame 51, as shown in FIGS. 8A and 8B.

In the present embodiment, the frame 51 is held and sandwiched between the first surface 40a of the base 40 and the surface of the reflection member 411 of the wavelength converter 41. The liquid metal 42 is disposed in the region surrounded by the base 40, the wavelength converter 41, and the frame 51.

The frame 51 is made, for example, of metal such as stainless steel and copper, resin, or rubber, and the frame 51 made of rubber can seal the gap between the base 40 and wavelength converter 41 to prevent leakage of the liquid metal 42.

The wavelength conversion apparatus 204 according to the present embodiment, which includes the frame 51, can be configured to prevent leakage of the liquid metal 42 without formation of a recess at the surface of the base 40 or the wavelength converter 41.

The present embodiment, in which the first restrictor 43 seals the outer side of the frame 51, allows enhancement of the effect of preventing leakage of the liquid metal 42. The first restrictor 43 may be replaced with the first restrictor 143 including the pair of plate springs 143a. The first restrictor 243 including the plate springs 143a and the sealing member 43a may be used to hold the wavelength converter 41 at the base 40, as in the second variation.

Fourth Embodiment

The wavelength conversion apparatus according to a fourth embodiment will be subsequently described. The wavelength conversion apparatus according to the present embodiment greatly differs from the wavelength conversion apparatus 4 according to the first embodiment in that a capillary force generating member is provided between the base 40 and the wavelength converter 41. In the following description, the configurations and members common to those in the first embodiment have the same reference characters, and will not be described in detail or will be described in a simplified manner.

Figure 9:
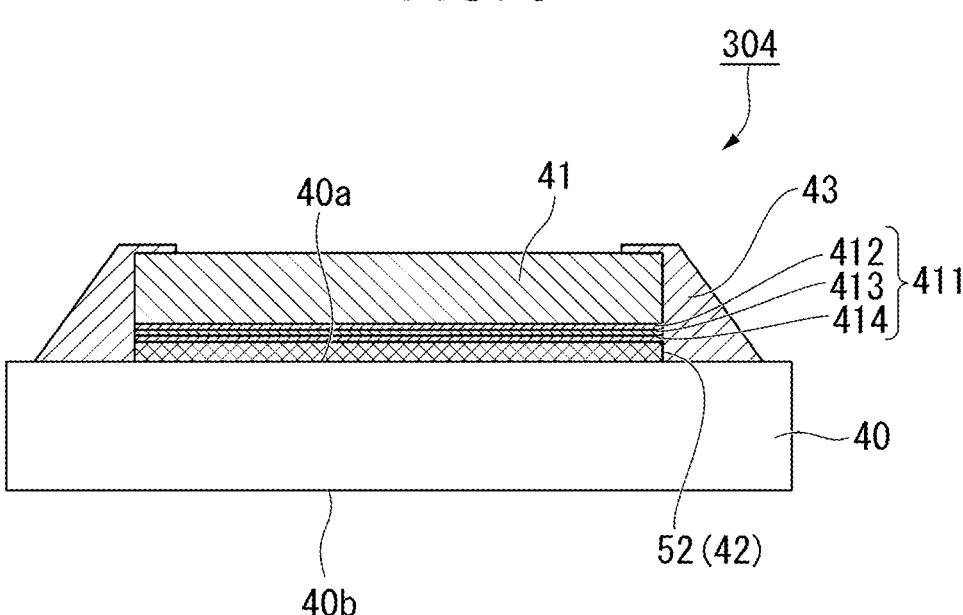
FIG. 9 is a cross-sectional view showing the configuration of the wavelength conversion apparatus according to a fourth embodiment.

FIG. 9 is a cross-sectional view showing the configuration of the wavelength conversion apparatus according to the present embodiment.

A wavelength conversion apparatus 304 according to the present embodiment includes the base 40, the wavelength converter 41, the liquid metal 42, the first restrictor 43, and a capillary force generator (holder) 52, as shown in FIG. 9.

In the present embodiment, the capillary force generator 52 is held and sandwiched between the first surface 40a of the base 40 and the rear surface 41b of the wavelength converter 41 (surface of reflection member 411). The capillary force generator 52 generates a capillary force that holds the liquid metal 42. The capillary force generator 52 is formed, for example, of thin wires having a diameter of several tens of micrometers and woven into a mesh or a thin plate etched into a mesh.

The first restrictor 43 may be replaced with the first restrictor 143 including the pair of plate springs 143a. The first restrictor 243 including the plate springs 143a and the sealing member 43a may be used to hold the wavelength converter 41 at the base 40, as in the second variation.

The wavelength conversion apparatus 304 according to the present embodiment, which includes the capillary force generator 52, allows the liquid metal 42 to be satisfactorily held between the base 40 and the wavelength converter 41. Specifically, the capillary force generator 52 disposed immediately below the light emitting region of the wavelength converter 41 (phosphor layer 410), where the largest amount of heat is generated, allows the liquid metal 42 to be reliably present immediately below the light emitting region, where the largest amount of heat is generated, irrespective of the posture of the installed light source apparatus 2 including the wavelength conversion apparatus 4 (wavelength converter 41). The thus provided wavelength conversion apparatus

304 according to the present embodiment allows a light source apparatus having higher heat dissipation capability to be realized.

Figure 10:
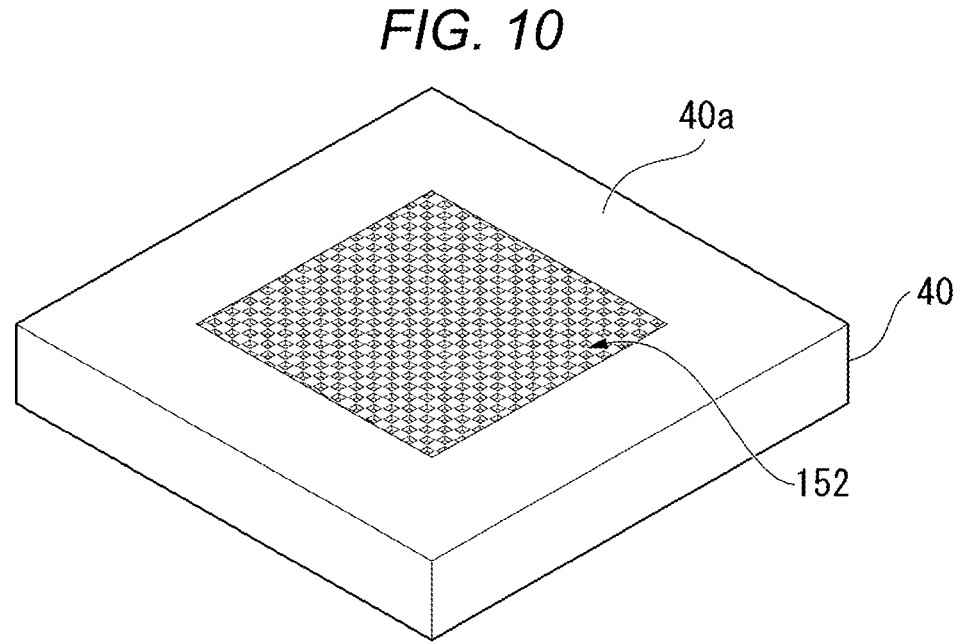
FIG. 10 is a perspective view showing a configuration in which a capillary force generator is formed in a base.

The present embodiment has been described with reference to the case where the capillary force generator 52 is formed of a mesh-shaped member by way of example, and a capillary force generator may be formed at the surface, of the base 40, that faces the wavelength converter 41, such as a capillary force generator (holder) 152 shown in FIG. 10. In this case, the capillary force generator 152 is formed at the first surface 40a of the base 40 and is formed of fine grooves or grids.

Third Variation

The wavelength conversion apparatus according to a third variation will be subsequently described. The present variation relates to the configuration of a combination of the frame in the third embodiment and the capillary force generating member in the fourth embodiment.

Figure 11:
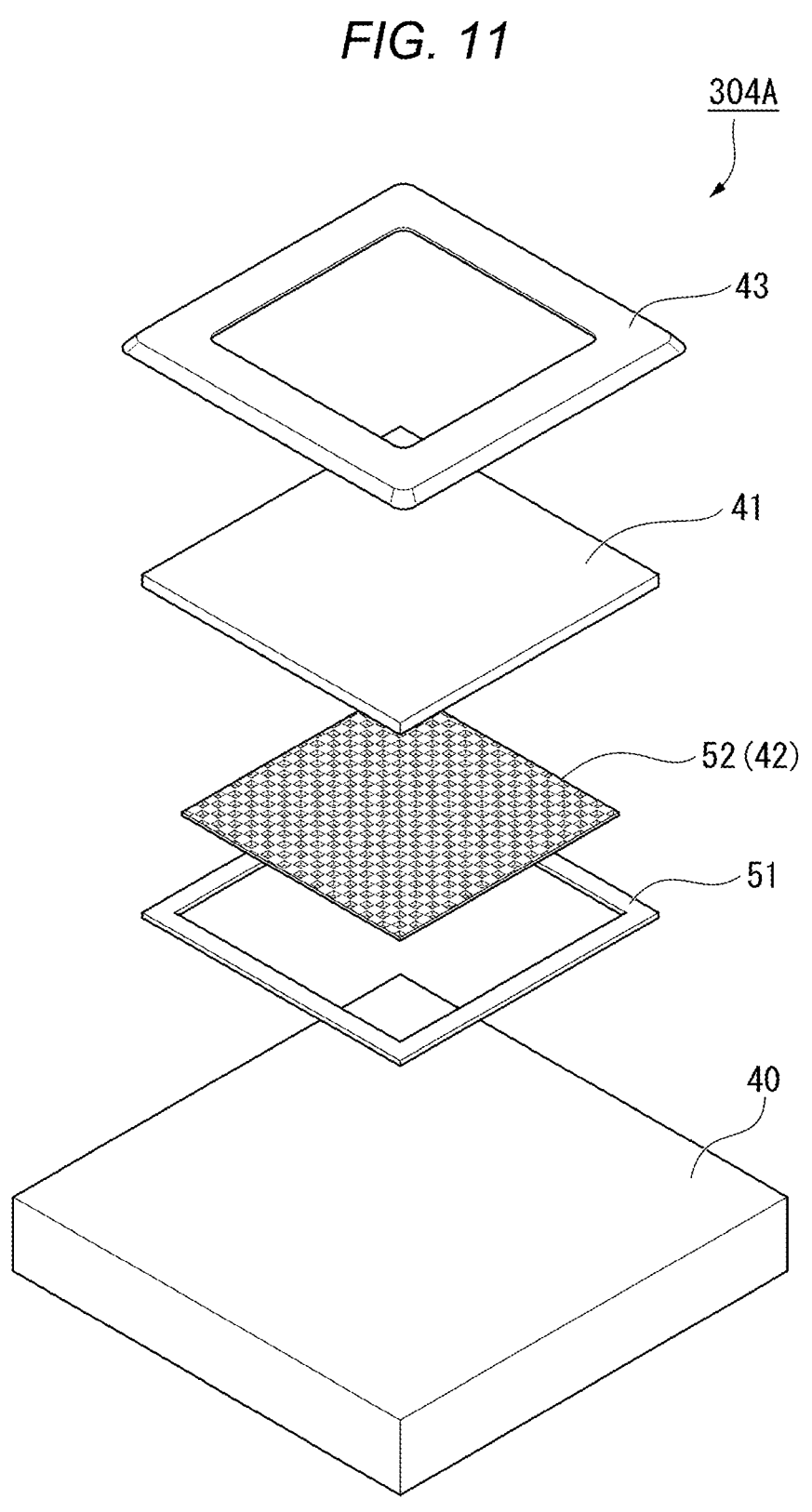
FIG. 11 is an exploded perspective view showing the configuration of the wavelength conversion apparatus according to a third variation.

FIG. 11 is an exploded perspective view showing the configuration of the wavelength conversion apparatus according to the present variation.

A wavelength conversion apparatus 304A according to the present variation includes the base 40, the wavelength converter 41, the liquid metal 42, the first restrictor 43, the frame 51, and the capillary force generator 52, as shown in FIG. 11. The frame 51 is thicker than the capillary force generator 52. The capillary force generator 52 is disposed in the region surrounded by the frame 51. In FIG. 11, the liquid metal 42 permeates the capillary force generator 52 and is held thereby.

In the wavelength conversion apparatus 304A according to the present variation, which includes the capillary force generator 52 in the region surrounded by the frame 51, the frame 51 prevents leakage of the liquid metal 42 out of the wavelength conversion apparatus 304A, and a light source apparatus that excels in heat dissipation capability can be provided with the aid of the capillary force generator 52.

Fifth Embodiment

The wavelength conversion apparatus according to a fifth embodiment will be subsequently described. The present embodiment greatly differs in configuration from the other embodiments and variations in that the wavelength converter 41 is disposed in a recess formed in the base. In the following description, the configurations and members common to those in the first embodiment have the same reference characters, and will not be described in detail or will be described in a simplified manner.

Figure 12:
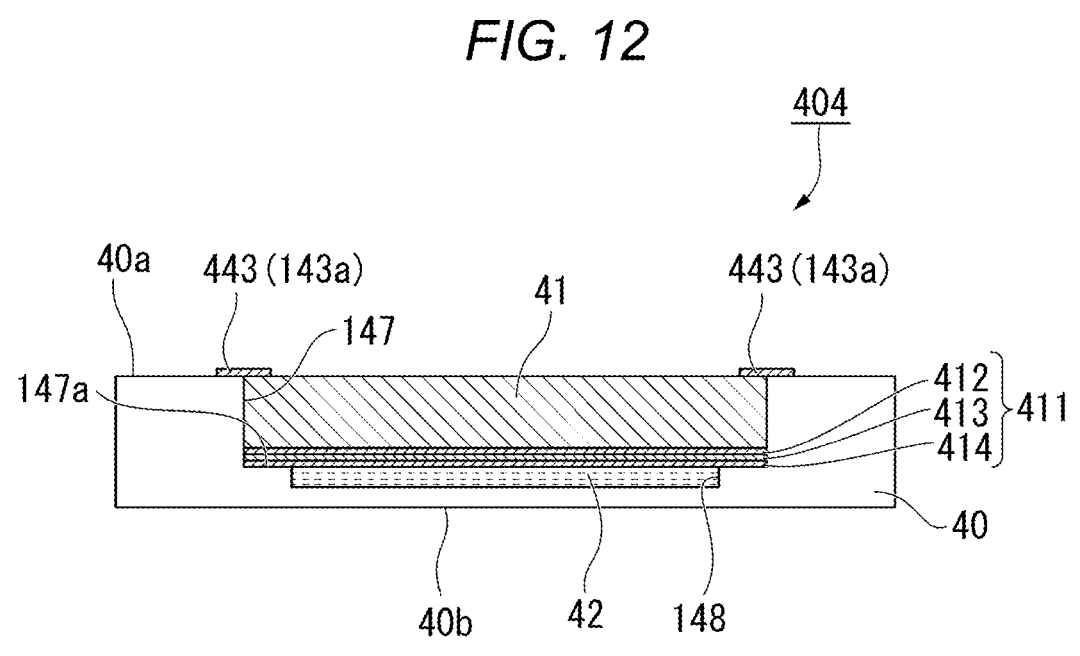

FIG. 12 is a cross-sectional view showing the configuration of the wavelength conversion apparatus according to the present embodiment.

A wavelength conversion apparatus 404 according to the present embodiment includes the base 40, the wavelength converter 41, the liquid metal 42, and a first restrictor 443, as shown in FIG. 12.

In the present embodiment, the wavelength converter 41 is disposed in a recess (second recess) 147 formed at the first surface 40a of the base 40. The upper surface of wavelength converter 41 (light exiting surface 41a) is flush with the first surface 40a of the base 40. The first restrictor 443 (pair of plate springs 143a) is so provided that the first restrictor 443 extends to partially cover the light exiting surface 41a of the wavelength converter 41 and the first surface 40a.

A recess (first recess) 148 is formed at a bottom surface 147*a* of the recess 147. The depth of the recess 148 is set at a value ranging, for example, from 5 µm to 100 µm. The recess 148 has a planar area smaller than the planar area of the recess 147 when viewed in the optical axis direction 41C. The planar area of the recess 148 is smaller than the planar area of the wavelength converter 41 (phosphor layer 410). Therefore, the rear surface 41*b* of the wavelength converter 41 is separate from the base 40 in the portion where the rear surface 41*b* faces the recess 148 but is in contact with the bottom surface 147*a* of the recess 147 in the portion where the rear surface 41*b* does not face the recess 148. In the present embodiment, the liquid metal 42 is disposed in the recess 148. The volume of the liquid metal 42 is set so as to be smaller than (60% to 99%, for example) the volume of the recess 148.

The wavelength converter apparatus 404 according to the present embodiment, in which the wavelength converter 41 is disposed in the recess 147 formed in the base 40, allows an increase in the area where the wavelength converter 41 and the base 40 are in contact with each other. The heat is thus efficiently transferred from the wavelength converter 41 toward the base 40, whereby the performance of cooling the wavelength converter 41 can be increased. The wavelength converter 41 can therefore generate brighter illumination light WL.

The technical scope of the present disclosure is not limited to the embodiments described above, and a variety of changes can be made thereto to the extent that the changes do not depart from the intent of the present disclosure. An aspect of the present disclosure can be an appropriate combination of the characteristic portions in the embodiments described above.

In addition, the specific descriptions of the shape, the number, the arrangement, the materials, and other factors of the components of the light source apparatus and the projector are not limited to those in the embodiments described above and can be changed as appropriate. The aforementioned embodiments have been described with reference to the case where the light source apparatus according to the present disclosure is incorporated in a projector using liquid crystal panels, but not necessarily. The light source apparatus according to the present disclosure may be incorporated in a projector using a digital micromirror device as each of the light modulators. The projector may not include a plurality of light modulators and may instead include only one light modulator.

The aforementioned embodiments have been described with reference to the case where the light source apparatus according to the present disclosure is incorporated in a projector, but not necessarily. The light source apparatus according to the present disclosure may be used as a lighting apparatus, a headlight of an automobile, and other components.

A wavelength conversion apparatus according to an aspect of the present disclosure may have the configuration below.

The wavelength conversion apparatus according to the aspect of the present disclosure includes a base having a first surface, a wavelength converter that is disposed at the side facing the first surface of the base, converts first light having a first wavelength band into second light having a second wavelength band different from the first wavelength band, and has a light exiting surface which is provided at the side opposite from the base and via which the second light exits, a liquid metal disposed between the base and the wavelength converter, and a first restrictor that holds the wavelength converter at the base and restricts the position of the wavelength converter in a first direction along a normal to the light exiting surface.

In the wavelength conversion apparatus according to the aspect of the present disclosure, the first restrictor may include a sealing member that seals the liquid metal between the base and the wavelength converter.

In the wavelength conversion apparatus according to the aspect of the present disclosure, the sealing member may be disposed so as to extend to the outer edge of the light exiting surface of the wavelength converter, the side surface, of the wavelength converter, that intersects with the light exiting surface, and a portion of the first surface of the base.

In the wavelength conversion apparatus according to the aspect of the present disclosure, the first restrictor may include an elastic member that presses the wavelength converter toward the base.

The wavelength conversion apparatus according to the aspect of the present disclosure may further include a second restrictor that restricts the position of the wavelength converter in a second direction perpendicular to the first direction.

In the wavelength conversion apparatus according to the aspect of the present disclosure, at least a portion of the liquid metal may be disposed in a first recess formed in at least one of the base and the wavelength converter.

In the wavelength conversion apparatus according to the aspect of the present disclosure, the base may have the first recess and a second recess having a planar area smaller than the planar area of the first recess when viewed in the first direction. The first recess may be formed at the bottom surface of the second recess. The liquid metal may be disposed in the first recess. The wavelength converter may be disposed in the second recess.

In the wavelength conversion apparatus according to the aspect of the present disclosure, the planar area of the first recess may be smaller than the planar area of the wavelength converter when viewed in the first direction.

The wavelength conversion apparatus according to the aspect of the present disclosure may further include a frame disposed between the base and the wavelength converter, and the liquid metal may be disposed in a region surrounded by the base, the wavelength converter, and the frame.

The wavelength conversion apparatus according to the aspect of the present disclosure may further include a holder that is disposed between the base and the wavelength converter and produces a capillary force that holds the liquid metal.

In the wavelength conversion apparatus according to the aspect of the present disclosure, the holder may be formed at a surface, of the base, that faces the wavelength converter.

In the wavelength conversion apparatus according to the aspect of the present disclosure, the wavelength converter may include a wavelength conversion layer that converts the first light into the second light, and a reflection member that is provided at the surface, of the wavelength conversion layer, that faces the base and reflects the first light and the second light, and the reflection member may have a multilayer structure including a reflection layer, and a protective layer disposed at the side, of the reflection layer, that faces the liquid metal.

In the wavelength conversion apparatus according to the aspect of the present disclosure, the base may be a vapor chamber.

A light source apparatus according to another aspect of the present disclosure may have the configuration below.

The light source apparatus according to the other aspect of the present disclosure includes a light source that outputs the first light and the wavelength conversion apparatus on which the first light outputted from the light source is incident.

A projector according to a still another aspect of the present disclosure may have the configuration below.

The projector according to the still other aspect of the present disclosure includes the light source apparatus according to the aspect of the present disclosure, a light modulator that modulates light outputted from the light source apparatus in accordance with image information, and a projection optical apparatus that projects the light modulated by the light modulator.

What is claimed is:

1. A wavelength conversion apparatus comprising:
a base having a first surface;
a wavelength converter disposed at a first surface side of the base and configured to convert first light having a first wavelength band into second light having a second wavelength band different from the first wavelength band, the wavelength converter including a light exiting surface which is provided at a side opposite from the base and via which the second light exits;
a liquid metal disposed between the base and the wavelength converter; and
a first restrictor holding the wavelength converter at the base and restricting a position of the wavelength converter in a first direction along a normal to the light exiting surface,
wherein at least a portion of the liquid metal is disposed in a first recess formed in at least one of the base and the wavelength converter.

2. The wavelength conversion apparatus according to claim 1,
wherein the first restrictor includes a sealing member that seals the liquid metal between the base and the wavelength converter.

3. The wavelength conversion apparatus according to claim 2,
wherein the sealing member is disposed so as to intersect an outer edge of the light exiting surface of the wavelength converter, a side surface of the wavelength converter intersecting the light exiting surface, and a portion of the first surface of the base.

4. The wavelength conversion apparatus according to claim 1,
wherein the first restrictor includes an elastic member that presses the wavelength converter toward the base.

5. The wavelength conversion apparatus according to claim 4, further comprising
a second restrictor that restricts the position of the wavelength converter in a second direction perpendicular to the first direction.

6. The wavelength conversion apparatus according to claim 1,
wherein the base has the first recess and a second recess, the second recess having a planar area smaller than a planar area of the first recess when viewed in the first direction,
the first recess is formed at a bottom surface of the second recess,
the liquid metal is disposed in the first recess, and
the wavelength converter is disposed in the second recess.

7. The wavelength conversion apparatus according to claim 1, wherein a planar area of the first recess is smaller than a planar area of the wavelength converter when viewed in the first direction.

8. The wavelength conversion apparatus according to claim 1, further comprising
a frame disposed between the base and the wavelength converter, and
wherein the liquid metal is disposed in a region surrounded by the base, the wavelength converter, and the frame.

9. The wavelength conversion apparatus according to claim 1, further comprising
a holder disposed between the base and the wavelength converter and configured to produce a capillary force that holds the liquid metal.

10. The wavelength conversion apparatus according to claim 9,
wherein the holder is formed at a surface, of the base, that faces the wavelength converter.

11. The wavelength conversion apparatus according to claim 1,
wherein the wavelength converter includes a wavelength conversion layer that converts the first light into the second light, and a reflection member that is provided at a surface, of the wavelength conversion layer, that faces the base, the reflection member being configured to reflect the first light and the second light, and
the reflection member has a multilayer structure including a reflection layer and a protective layer, the protective layer disposed at a side, of the reflection layer, that faces the liquid metal.

12. The wavelength conversion apparatus according to claim 1,
wherein the base is a vapor chamber.

13. A light source apparatus comprising:
a light source that emits the first light; and
the wavelength conversion apparatus according to claim 1 on which the first light emitted from the light source is incident.

14. A projector comprising:
the light source apparatus according to claim 13;
a light modulator that modulates light emitted from the light source apparatus; and
a projection optical apparatus that projects the light modulated by the light modulator.

15. A wavelength conversion apparatus comprising:
a base having a first surface;
a wavelength converter disposed at a first surface side of the base and configured to convert first light having a first wavelength band into second light having a second wavelength band different from the first wavelength band, the wavelength converter including a light exiting surface which is provided at a side opposite from the base and via which the second light exits;
a liquid metal disposed between the base and the wavelength converter; and
a first restrictor holding the wavelength converter at the base and restricting a position of the wavelength converter in a first direction along a normal to the light exiting surface,
wherein the wavelength converter includes a wavelength conversion layer that converts the first light into the second light, and a reflection member that is provided at a surface, of the wavelength conversion layer, that faces the base, the reflection member being configured to reflect the first light and the second light, and the reflection member has a multilayer structure including a reflection layer and a protective layer, the protective layer disposed at a side, of the reflection layer, that faces the liquid metal.

16. A light source apparatus comprising:
a light source that emits the first light; and
the wavelength conversion apparatus according to claim 15 on which the first light emitted from the light source is incident.

17. A projector comprising:
the light source apparatus according to claim 16;
a light modulator that modulates light emitted from the light source apparatus; and
a projection optical apparatus that projects the light modulated by the light modulator.

18. A wavelength conversion apparatus comprising:
a base having a first surface;
a wavelength converter disposed at a first surface side of the base and configured to convert first light having a first wavelength band into second light having a second wavelength band different from the first wavelength band, the wavelength converter including a light exiting surface which is provided at a side opposite from the base and via which the second light exits;
a liquid metal disposed between the base and the wavelength converter; and
a first restrictor holding the wavelength converter at the base and restricting a position of the wavelength converter in a first direction along a normal to the light exiting surface,
wherein the base is a vapor chamber.

19. A light source apparatus comprising:
a light source that emits the first light; and
the wavelength conversion apparatus according to claim 18 on which the first light emitted from the light source is incident.

20. A projector comprising:
the light source apparatus according to claim 19;
a light modulator that modulates light emitted from the light source apparatus; and
a projection optical apparatus that projects the light modulated by the light modulator.

* * * * *